C. R. HIGHT,

Assignor to S. A. EATON.

Wheelbarrow

No. 9,342. Reissued Aug. 17, 1880.

WITNESSES

J. O. M. Cleary,

Am Bright

INVENTOR

C. R. Hight.

By Leggett & Leggett.

ATTORNEY

N. PETERS, PHOTO-LITHOGRAPHER, WASHINGTON, D. C.

UNITED STATES PATENT OFFICE.

CORNELIUS R. HIGHT, OF GENEVA, ILL., ASSIGNOR TO STEPHEN A. EATON.

WHEELBARROW.

SPECIFICATION forming part of Reissued Letters Patent No. 9,342, dated August 17, 1880.

Original No. 130,129, dated August 6, 1872. Application for reissue filed December 4, 1879.

*To all whom it may concern:*

Be it known that I, CORNELIUS R. HIGHT, of Geneva, county of Kane, State of Illinois, have invented new and useful Improvements in Wheelbarrows; and I do hereby declare that the following is a full, clear, and exact description of same, such as will enable others skilled in the art to make and use it, reference being had to the annexed drawings and letters of reference marked thereon, making a part of this specification.

My invention relates, first, to a novel construction of the frame wherein the upright that serves as a brace to the forward end of the box or tray is continued downward past the bed and connected with the leg-support; also, in a construction wherein the brace or support for the wheel end of the box or tray is continued downward past the bed and connected with the leg-support beneath, the said brace extending downward, so as to rest upon the ground in the nature of a runner.

Figure 1:
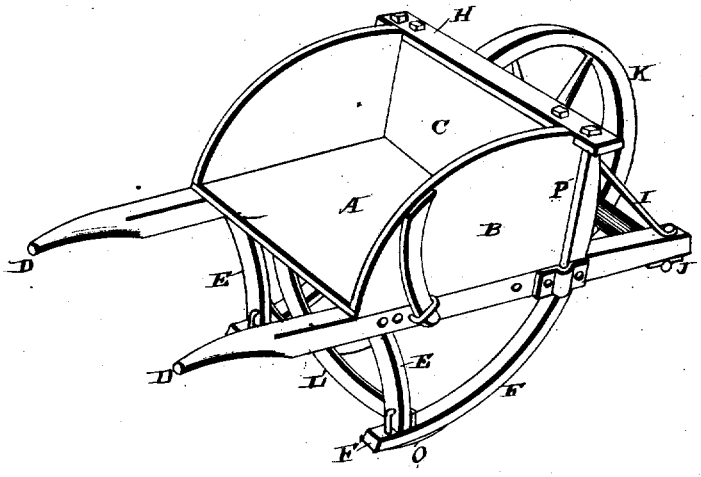
Figure 2:
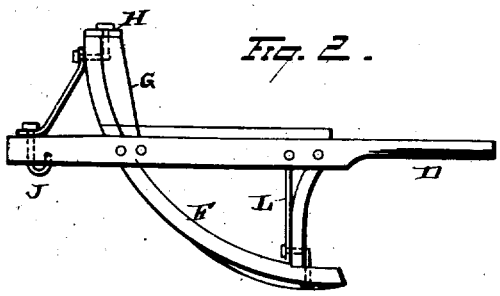
Figure 3:
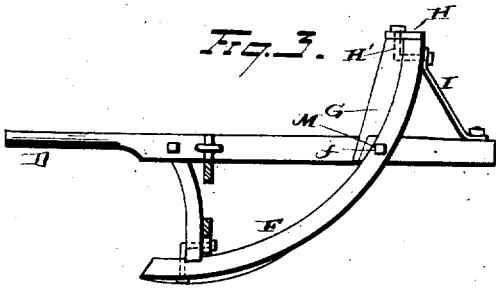
Figure 4:
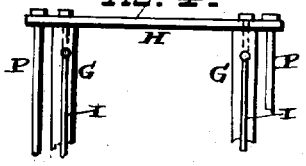
Figure 7:
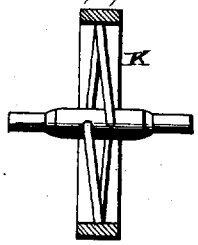
Figure 5:
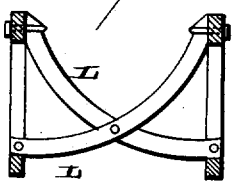
Figure 6:
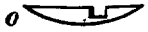
Figure 9:
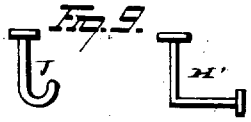
Figure 8:
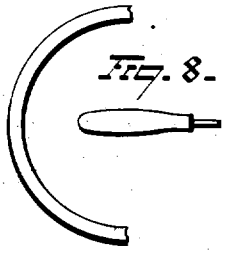
Figure 10:
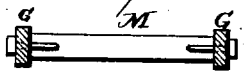

In the drawings, Figure 1 is a perspective view of a wheelbarrow complete; Fig. 2, a side view of the frame; Fig. 3, a longitudinal central sectional view of the same; Fig. 4, a view looking toward the end of the frame adjacent to the wheel; Fig. 5, a separate view of the cross-braces; Fig. 6, a separate view of one of the shoes; Fig. 7, a sectional view of the wheel; Fig. 8, a view of a felly and spoke. Fig. 9 represents angle-bolts used in the structure; Fig. 10, a cross-bar used to couple the side sections of the frame together.

A is the bottom, B the sides, and C the back, of the wheelbarrow box or tray. D are the handles, which also form the supporting-bed of the structure. E are the leg-supports adjacent to the handles.

F are the uprights which support the wheel end of the tray or box. These uprights are projected downward past the frame, as shown at F′, and are attached to the leg-supports E. They are also attached at *f* to the handles D.

G represents uprights, and H a suitable cross-piece. The uprights and cross-piece are suitably fastened together and to the brace F by bolts H′, so that the whole is supported by the brace F. Brace-rods I are employed to give additional stiffness to the structure, and bolts J may serve as boxes for the axle of the wheel K.

L represents cross-braces for stiffening the structure. M is a cross-bar which serves to unite the uprights G.

The wheel is made with fellies, preferably in but two parts, and with spokes arranged in straddle-rows about the hub, so as to brace each other.

O represent shoes, which may be located on the portion, F′, of the brace F at a point where it comes in contact with the ground to receive the wear.

Rods P serve to hold the cross-piece to the top of the uprights G, and leave spaces for the insertion of the side-boards.

The parts E, F, and L may be made of bent material, such as is usually employed in the manufacture of hounds, fellies, &c. This structure is very simple, yet exceedingly strong and durable.

The extension of the brace so that its upper end serves as a support for the wheel end of the box or tray, while its lower end projects toward the handles and serves as a brace for the leg-supports, makes a combination which is at once efficient and makes a stiff and strong frame-work.

What I claim is—

1. In a wheelbarrow, the combination, with a front board and a curved brace which provides front bearing for said board, of an independent diagonal brace which extends between the upper extremity of said curved brace and the forward extremity of the arm which supports the wheel-shaft, and an angle-bolt whose vertical arm passes up through the front board, and whose horizontal arm passes out transversely through the curved brace and the diagonal brace, substantially as described.

2. In a wheelbarrow, the combination, with a vertically-curved brace extending from the front board to and beneath the leg, of an angle-bolt whose horizontal arm passes transversely through the leg, and whose vertical arm passes through said brace, substantially as set forth.

3. In a wheelbarrow, the combination, with a vertically-curved brace which extends from the front board to and beneath the leg, and a cross-brace extending from the bottom of said leg to the top of the other leg, of an angle-bolt whose horizontal arm passes through said cross-brace and leg, and whose vertical arm passes through said curved brace, substantially as set forth.

4. The combination, with the leg-supports, of cross-braces L, extending from the top of each leg-support to the bottom of the other, substantially as and for the purposes described.

5. In a wheelbarrow, the combination, with the leg-supports, of curved cross-braces extending from the top of one leg-support to the bottom of the other, substantially as and for the purposes described.

CORNELIUS R. HIGHT.

Witnesses:
GEO. MEREDITH,
ETTA PEIRCE.